US011195169B1

(12) United States Patent
Hartman

(10) Patent No.: US 11,195,169 B1
(45) Date of Patent: Dec. 7, 2021

(54) SYSTEMS AND METHODS FOR DIGITAL WALLET

(71) Applicant: United Services Automobile Association (USAA), San Antonio, TX (US)

(72) Inventor: Wayne Maurice Hartman, Pocatello, ID (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 179 days.

(21) Appl. No.: 16/229,201

(22) Filed: Dec. 21, 2018

Related U.S. Application Data

(63) Continuation of application No. 12/362,865, filed on Jan. 30, 2009, now abandoned.

(51) Int. Cl.
*G06Q 20/36* (2012.01)
*G06Q 20/12* (2012.01)
*G06Q 20/10* (2012.01)
*G06Q 20/08* (2012.01)

(52) U.S. Cl.
CPC ......... *G06Q 20/363* (2013.01); *G06Q 20/085* (2013.01); *G06Q 20/102* (2013.01); *G06Q 20/12* (2013.01)

(58) Field of Classification Search
CPC ...... G06Q 40/02; G06Q 20/363; G06Q 20/12; G06Q 20/102; G06Q 20/085
See application file for complete search history.

(56) References Cited

U.S. PATENT DOCUMENTS

| | | | |
|---|---|---|---|
| 6,874,037 B1 | 3/2005 | Abram | |
| 7,257,581 B1 | 8/2007 | Steele et al. | |
| 7,613,834 B1 * | 11/2009 | Pallipuram | G06F 16/273 709/248 |
| 2001/0007983 A1 | 7/2001 | Lee | |
| 2002/0069122 A1 * | 6/2002 | Yun | G06Q 30/06 705/26.1 |
| 2002/0179704 A1 | 12/2002 | Deaton | |
| 2002/0186249 A1 | 12/2002 | Lu et al. | |

(Continued)

OTHER PUBLICATIONS

Rukzio, Enrico et al., "Automatic form filling on mobile devices", Elsevier B.V., Available online Sep. 20, 2007. (Year: 2007).*

(Continued)

*Primary Examiner* — Eric T Wong
(74) *Attorney, Agent, or Firm* — Perkins Coie LLP

(57) ABSTRACT

A digital wallet may be accessed via a plugin on a browser. The digital wallet may store account information pertaining to various accounts of a user. The account information may be related to funding sources, reward programs, loyalty programs, retailers and other merchants, driver license information, voter registration information, government agencies, etc. The user may drag and drop account information from the digital wallet via the plugin to a checkout page or the plugin may automatically recognize and populate a checkout page. In an implementation, the plugin may select a funding source based on rules, such as use one funding source for payment of less than a predetermined amount and use another funding source for payment of at least the predetermined amount.

18 Claims, 9 Drawing Sheets

(56) References Cited

U.S. PATENT DOCUMENTS

| | | | |
|---|---|---|---|
| 2003/0055785 A1 | 3/2003 | Lahiri | |
| 2005/0198563 A1* | 9/2005 | Kristjansson | G06F 40/174 |
| | | | 715/224 |
| 2005/0257134 A1 | 11/2005 | Goodman | |
| 2006/0064372 A1 | 3/2006 | Gupta | |
| 2006/0076400 A1 | 4/2006 | Fletcher | |
| 2006/0106680 A1 | 5/2006 | Shafron | |
| 2007/0256005 A1* | 11/2007 | Schneider | G06F 40/134 |
| 2008/0006685 A1* | 1/2008 | Rackley, III | G06Q 40/00 |
| | | | 235/379 |
| 2008/0046362 A1 | 2/2008 | Easterly | |
| 2008/0091546 A1* | 4/2008 | Kirovski | G06Q 30/0623 |
| | | | 705/26.64 |
| 2008/0235567 A1 | 9/2008 | Raj et al. | |
| 2009/0076966 A1* | 3/2009 | Bishop | G07F 7/0866 |
| | | | 705/67 |
| 2009/0089176 A1* | 4/2009 | McCabe | G06Q 30/0601 |
| | | | 705/26.1 |
| 2009/0132417 A1* | 5/2009 | Scipioni | G06Q 30/0603 |
| | | | 705/44 |
| 2009/0233579 A1* | 9/2009 | Castell | G06Q 20/363 |
| | | | 455/411 |

OTHER PUBLICATIONS

Wu, Min et al., "Web Wallet: Preventing Phishing Attacks by Revealing User Intentions", Pervasive and Mobile Computing, vol. 4, Issue 2, 2008, pp. 161-181 (Year: 2008).*
U.S. Appl. No. 12/362,865, filed Jan. 30, 2009, Systems and Methods for Digital Wallet.
GPayments, Innovate-Empower-Adapt, Authentication and Payment Solutions: "Visa 3-D Secure vs. MasterCard SPA", www.gpayments.com, Mar. 1, 2002, 37 pages.

* cited by examiner

SYSTEMS AND METHODS FOR DIGITAL WALLET

CROSS REFERENCE TO RELATED APPLICATIONS

This application is a continuation of and claims priority to U.S. patent application Ser. No. 12/362,865, filed on Jan. 30, 2009, entitled "SYSTEMS AND METHODS FOR DIGITAL WALLET", pending, which is incorporated herein by reference in its entirety for all purposes.

BACKGROUND

Electronic commerce consists of the buying and selling of products or services over electronic systems such as the Internet and other computer networks. The amount of trade conducted electronically has grown extraordinarily since the spread of the Internet. Modern electronic commerce typically uses the World Wide Web at least at some point in the transaction's lifecycle, although it can encompass a wider range of technologies such as email.

A digital wallet (also known as an e-wallet) allows users to make electronic commerce transactions quickly and securely. A digital wallet functions much like a physical wallet and has evolved into a product or service that provides Internet users with a convenient way to store and use online shopping information. Conventional digital wallets provide little functionality for a user beyond storing information that a user can subsequently retrieve and use during an online transaction.

SUMMARY

A digital wallet may be accessed via a plugin on a browser. The digital wallet may store account information pertaining to various accounts of a user. The account information may be related to funding sources, reward programs, loyalty programs, retailers and other merchants, etc.

In an implementation, the user may drag and drop account information from the digital wallet via the plugin to a checkout page of a merchant or the plugin may automatically recognize and populate a checkout page.

In an implementation, the plugin may select a funding source based on an analysis of information with respect to rules established by the user. The rules may be directed to which funding sources may be used for particular purchase amounts, may be used at particular merchants, may be used to purchase particular items, etc.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
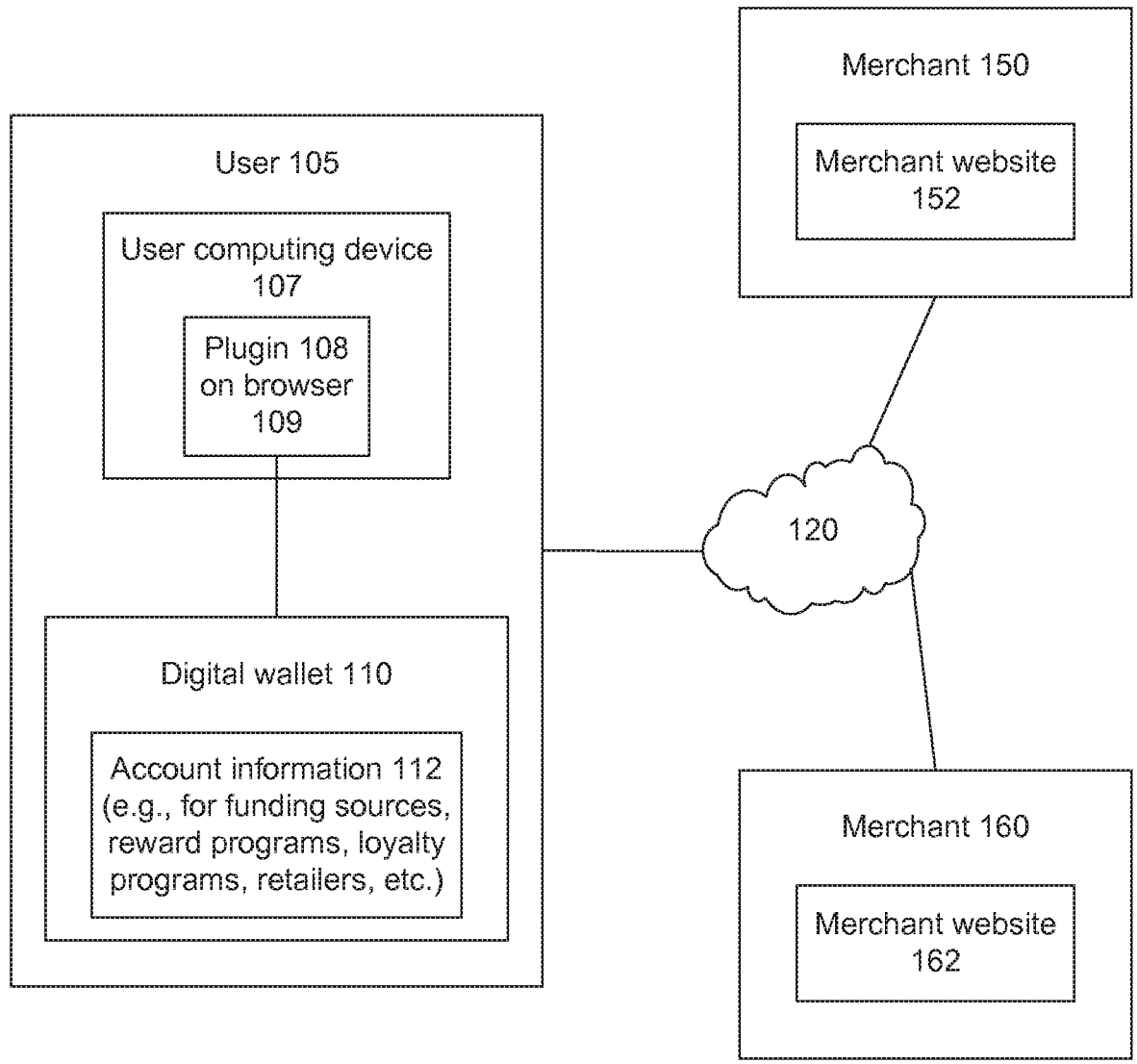
FIG. 1 is a block diagram of an implementation of a system in which example embodiments and aspects may be implemented.

FIG. 1 is a block diagram of an implementation of a system 100 in which example embodiments and aspects may be implemented. The system 100 may include a user 105 and one or more merchants, shown as merchants 150 and 160. Although only two merchants 150, 160 are shown, any number of merchants is contemplated. Each merchant 150, 160 may be any type of seller entity, such as a wholesaler or a retailer, and may have an associated website 152, 162, respectively. The user 105 may visit one of the websites 152, 162 via a browser 109 on a user computing device 107 and make an online purchase via a payment or checkout web page (referred to herein as a checkout page), for example, as described further herein.

The user computing device 107 may comprise any type of computing device, such as a personal computer (PC), a handheld computing device, a personal digital assistant (PDA), a smartphone, or a mobile phone, for example. An example user computing device is described with respect to FIG. 9.

The user 105, via the user computing device 107, may communicate with the websites 152, 162 of the merchants 150, 160, respectively, by way of a communications network 120 such as an intranet, the Internet, a local area network (LAN), a wide area network (WAN), a wireless fidelity (WiFi) network, a public switched telephone network (PSTN), a cellular network, a voice over Internet protocol (VoIP) network, and the like.

The user 105 may access a merchant by opening a communication pathway via the communications network 120 using the user computing device 107. There may be several ways in which the communication pathway may be established, including, but not limited to, an Internet connection via a website of the merchant. The user 105 may access the website and log into the website using credentials, such as, but not limited to, a username and a password.

The user 105 may be an individual or entity who maintains a digital wallet 110 that may be accessed via a plugin 108 on the browser 109 provided on the user computing device 107. In computing, a plugin consists of a computer program, module or device that interacts with a host application (a web browser, for example) to provide a specific function on demand. The plugin 108 may be provided to the user computing device 107 and its browser 109 using any known technique. An example browser with plugin is described with respect to FIG. 2.

The digital wallet 110 may store account information 112 pertaining to various accounts of the user 105. The account information 112 may be related to funding sources, reward programs, loyalty programs, retailers and other merchants, etc. The account information 112 may comprise account numbers, PIN (personal identification number) numbers, expiration dates, security numbers and codes, passwords and other data related to credentials and authentication, entity and account names and user names, shipping and billing addresses, telephone numbers of the account owner and/or the account issuer, contact information, birthdates, membership information, calling card information, medical and health information, travel club information, security verification questions and their answers, insurance cards, driver license information, voter registration information, etc.

In an implementation, the digital wallet 110 may be deployed on multiple user computing devices of the user 105. The multiple digital wallets may be synchronized among the various computing devices in order to keep the account information 112 current.

The digital wallet 110 may be transferred to a storage media such as a SIM (subscriber identity module) card, USB (universal serial bus) drive, SD (secure digital) card, etc. The digital wallet 110 may be transferable to various computing devices (e.g., phones, PDAs, etc.) of the user 105 so these devices may be used to provide funding source information to complete a transaction. For example, a phone of a user 105 may act as a wallet, replacing a physical wallet that the user carries, thereby becoming a "physical wallet".

The digital wallet 110 may be stored in storage at the client side, e.g., local to the user computing device 107. In this manner, there may be a single repository of funding and the user does not have to trust the storage of their personal and sensitive data to another party such as a merchant or a third party payment facility. In an implementation, the digital wallet 110 and the account information 112 may be stored in encrypted form on a local file system. Any known encryption technique(s) may be used. In an implementation, 256-bit AES (advanced encryption standard) encryption may be used.

The digital wallet 110 may be accessed via the plugin 108. The user 105 may select the plugin 108 via the user computing device 107 and be presented with an authentication request to unlock the digital wallet. In an implementation, the user 105 may provide authentication information, such as a username and password, to the plugin 108. If authenticated, the user may be provided with access to the digital wallet 110 and the account information 112 therein via the plugin 108.

In an implementation, the plugin 108 may allow the user to enter funding source information in checkout pages on websites associated with merchants. Alternatively or additionally, the plugin 108 may allow the user to enter any type of account information into any type of form or field, e.g., on a web page.

Thus, the plugin 108 may provide the digital wallet 110 to securely and locally store account information 112 such as funding source information (e.g., passwords, credit card information, checking account information, etc.). In an implementation, when the user 105 is making an online purchase, the user 105 may invoke the plugin 108 and the plugin 108 may populate known fields with funding source information. As described further herein, the user 105 may drag and drop account information 112 from the digital wallet 110 via the plugin 108 to a checkout page or the plugin 108 may automatically recognize and populate a checkout page. In an implementation, by dragging and dropping, the user 105 may select an element of the account information (e.g., by clicking on it with a mouse button or other input device), move the element (e.g., using the mouse or other input device) to a location on the checkout page, such as a field, and drop the element at that location (e.g., by releasing a mouse button or other input device). In an implementation, the plugin 108 can select a particular funding source based on rules, such as use one funding source for payment of less than a predetermined amount and use another funding source for payment of at least the predetermined amount.

In this manner, funding source information may be consolidated in a single digital form, using the plugin 108 on the browser 109, so that the funding source information can be used without the user 105 having to type it into a checkout page, a web form, or any other online input screen or field(s).

In an implementation, data may be maintained in the digital wallet 110 pertaining to websites 152, 162 of merchants 150, 160 (e.g., payment pages of the merchants 150, 160) may be stored along with data pertaining to how the account information should be applied to those websites.

Although examples described herein with respect to a digital wallet 110 may refer to funding sources, their information, and their online use at merchants 150, 160, the account information 112 and its use is not limited thereto. The account information 112 stored in the digital wallet 110 may be used at other entities, both physical and online. For example, such usage may include accessing and utilizing accounts relating to airline miles and points, hotel points, and points and awards pertaining to any reward program or loyalty program.

In an implementation, and as further described herein, when the user 105 is supplied a checkout page to complete a transaction, they may be presented a dialogue to unlock the digital wallet 110. Upon successful authentication, a dockable window may be presented with a tabbed user interface, allowing the user 105 to choose from various funding sources.

Figure 2:
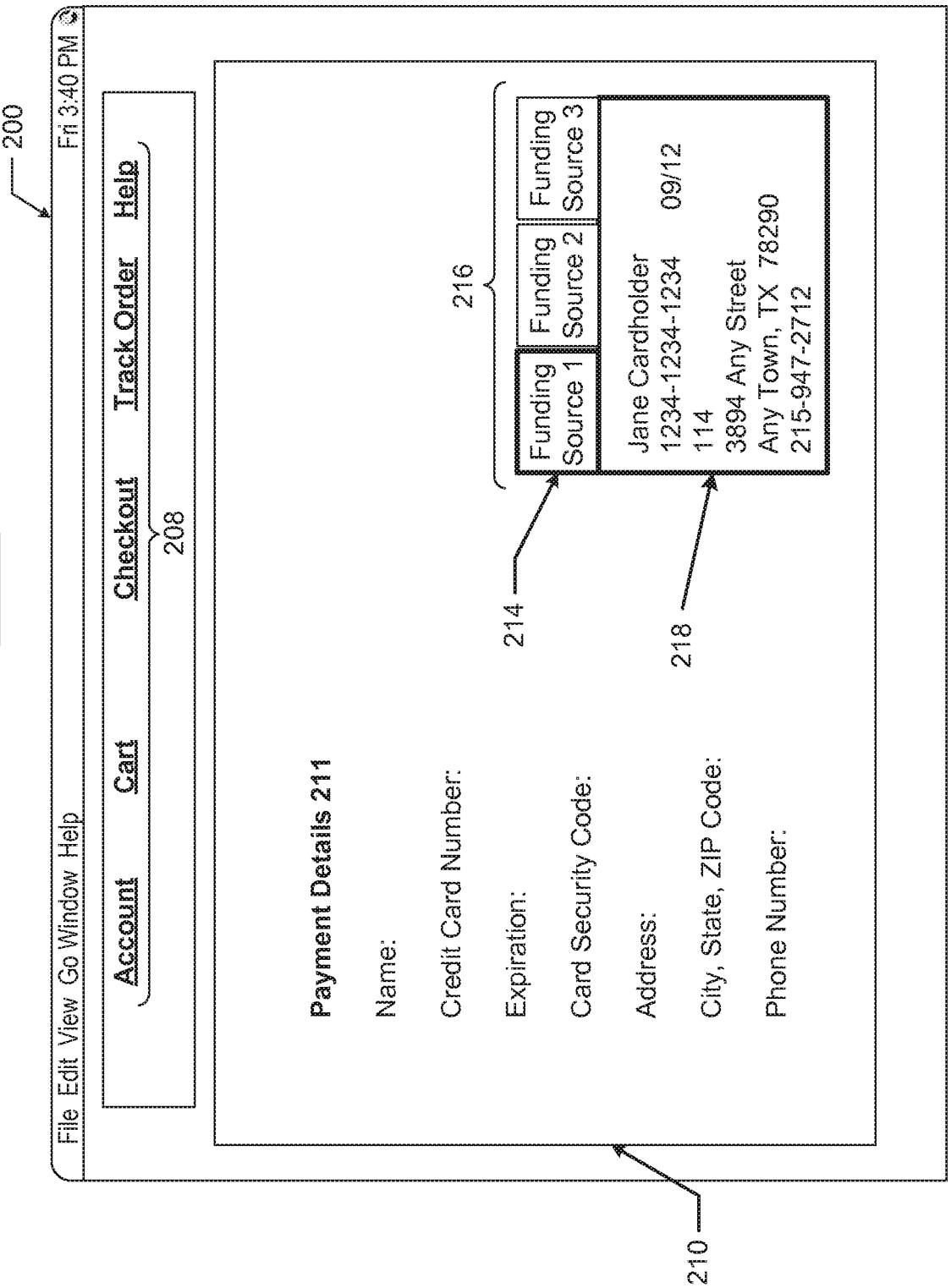
FIG. 2 is a diagram illustrating a browser in which aspects of a digital wallet may be rendered.

FIG. 2 is a diagram illustrating a browser 200 in which aspects of a digital wallet may be rendered. The browser 200 may be any type of known browser and may provide one or more links 208 of a website of a merchant. One of the links 208 may be for checkout. When the checkout link is selected, a checkout page 210 or a page requesting payment details 211 may be presented.

In an implementation, the user may be asked to provide login information (e.g., a username, PIN, password, biometrics, hardware tokens, etc.) in order to be authenticated for access to a digital wallet via a plugin 214. In another implementation, the user may be automatically logged in to the digital wallet via the plugin 214, e.g., if the user had earlier authenticated to the website or one of its web pages.

Pursuant to appropriate authentication, the plugin 214 representing the digital wallet may be provided anywhere on the display (e.g., as a dockable window on the checkout page 210 being displayed by the browser). The plugin 214 may comprise account information for one or more funding sources 216 of the user. The user may choose one of the funding sources 216 and be presented with the account information 218 of that funding source. In an implementation, the user may drag and drop the appropriate elements of the account information 218 into the corresponding field on the checkout page 210. The user may drag and drop one or more elements of the account information 218 (e.g., credit card number, expiration date, address, etc.) to the appropriate field or box on the checkout page 210, so that the user does not have to type that information into the checkout page 210.

In an implementation, the plugin 214 may comprise a plurality of tabs, each tab corresponding to a folder pertaining to a particular funding source. When the user chooses a tab, the account information of the funding source corresponding to the selected tab may be retrieved (e.g., from storage) and provided in the plugin 214.

The user may also access the plugin 214 to add or modify account information for a funding source, to add a new funding source (and associated account information), or to delete a funding source. Any technique for providing data to a plugin may be used.

Each of the funding sources 216 may be any type of funding account, such as an account directed to a loan (e.g., a home equity line of credit (HELOC)), a credit card, a checking account, a money market fund, etc. Any number of funding sources and their associated information may be stored in the digital wallet.

The account information 218 may comprise any type of information that a user may choose to store or that a form may request or require, such as the account holder name on the funding source, the account number, the expiration date, the card security code, a billing and/or a shipping address, and one or more phone numbers, for example. It is contemplated that any other data, such as but not limited to institutional information relating to the funding source (e.g., phone number, address, etc.), may be comprised within the account information 218.

Figure 3:
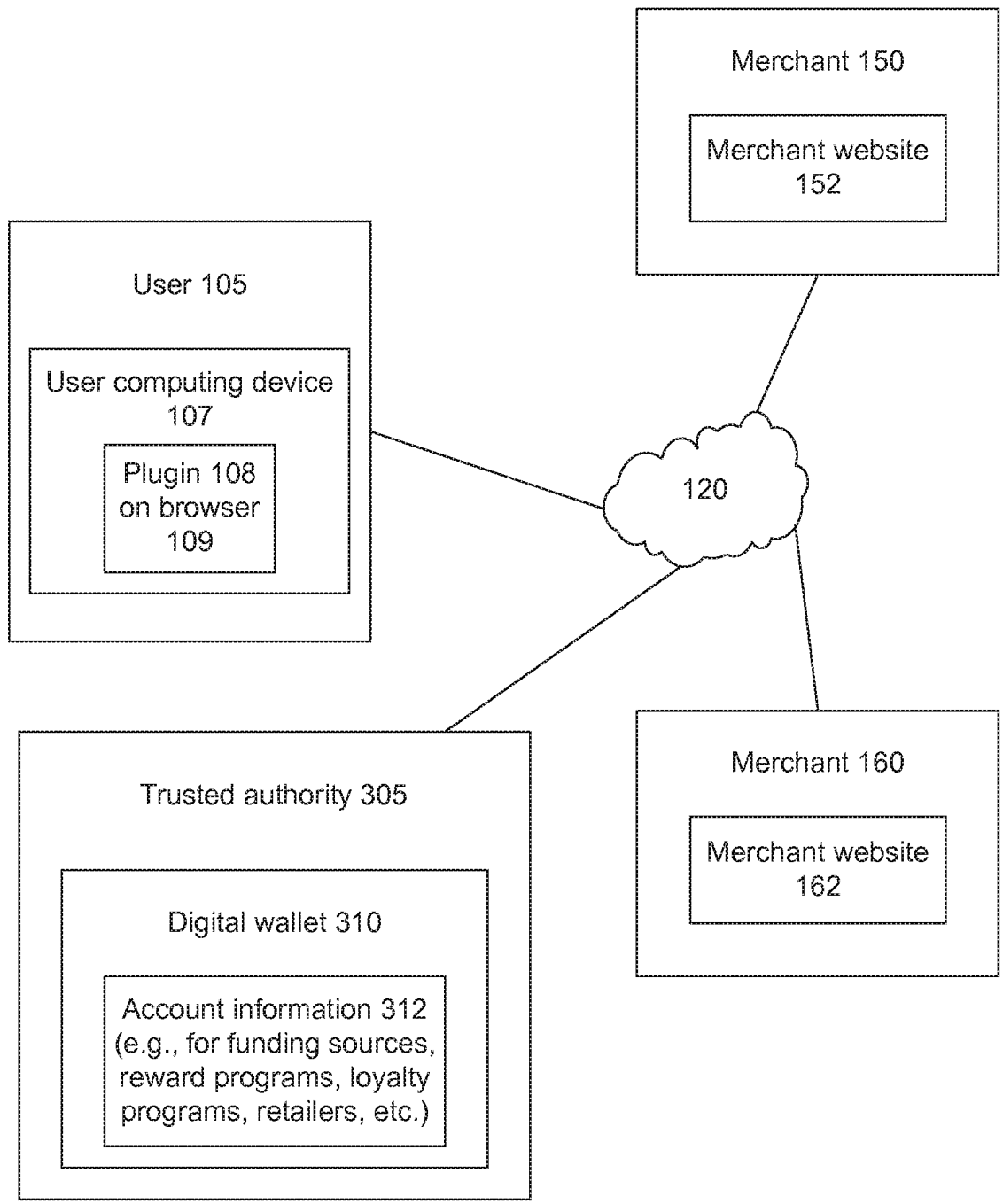
FIG. 3 is a block diagram of another implementation of a system in which example embodiments and aspects may be implemented.

FIG. 3 is a block diagram of another implementation of a system 300 in which example embodiments and aspects may be implemented. As with the system 100 of FIG. 1, the system 300 shows the merchants 150, 160 with merchant websites 152, 162 respectively, and a user 105 with a user computing device 107. The user computing device 107 comprises a plugin 108 on a browser 109.

Rather than the user 105 maintaining the digital wallet with account information as in the system 100 of FIG. 1, the system 300 comprises a trusted authority 305 that maintains the digital wallet 310 with account information 312. The account information 312 may comprise similar information as that of the account information 112, but it may be stored or secured by the trusted authority 305. In this manner, the user 105 does not have the responsibility of securely storing the digital wallet or the account information.

The trusted authority 305 may be a trusted third party comprising an entity which facilitates a transaction between the user 105 and a merchant 150 or 160, parties who trust the trusted authority 305. In an implementation, only the trusted authority 305 may store account information 312 of the user 105, and no merchant may store such account information 312 on behalf of the user 105.

When the user 105 wishes to add, delete, or modify account information 312 in the digital wallet 310, the plugin 108 may access the digital wallet 310 from the trusted authority 305. Similarly, when the user 105 wishes to access the digital wallet 310 and account information 312 for a checkout page or other page of a website, the plugin 108 may access the digital wallet 310 from the trusted authority 305. The plugin 108 may access the digital wallet 310 and account information 312 from the trusted authority 305 via the communications network 120 or any secure communications channel. The account information 312 may be encrypted (e.g., stored in an encrypted data store) and accessible to the user 105 upon the user 105 authenticating to the trusted authority 305 using the proper credentials, for example.

In an implementation, the trusted authority 305 may monitor, with the authorization of the user 105, the user's purchases, the merchants visited by the user 105, and the funding sources used for purchases. Such data mining may be useful to monitor buying trends and in determining advertising and product decisions and offerings.

In an implementation, the trusted authority 305 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may receive, process, and maintain the account information 312 for the user 105.

Figure 4:
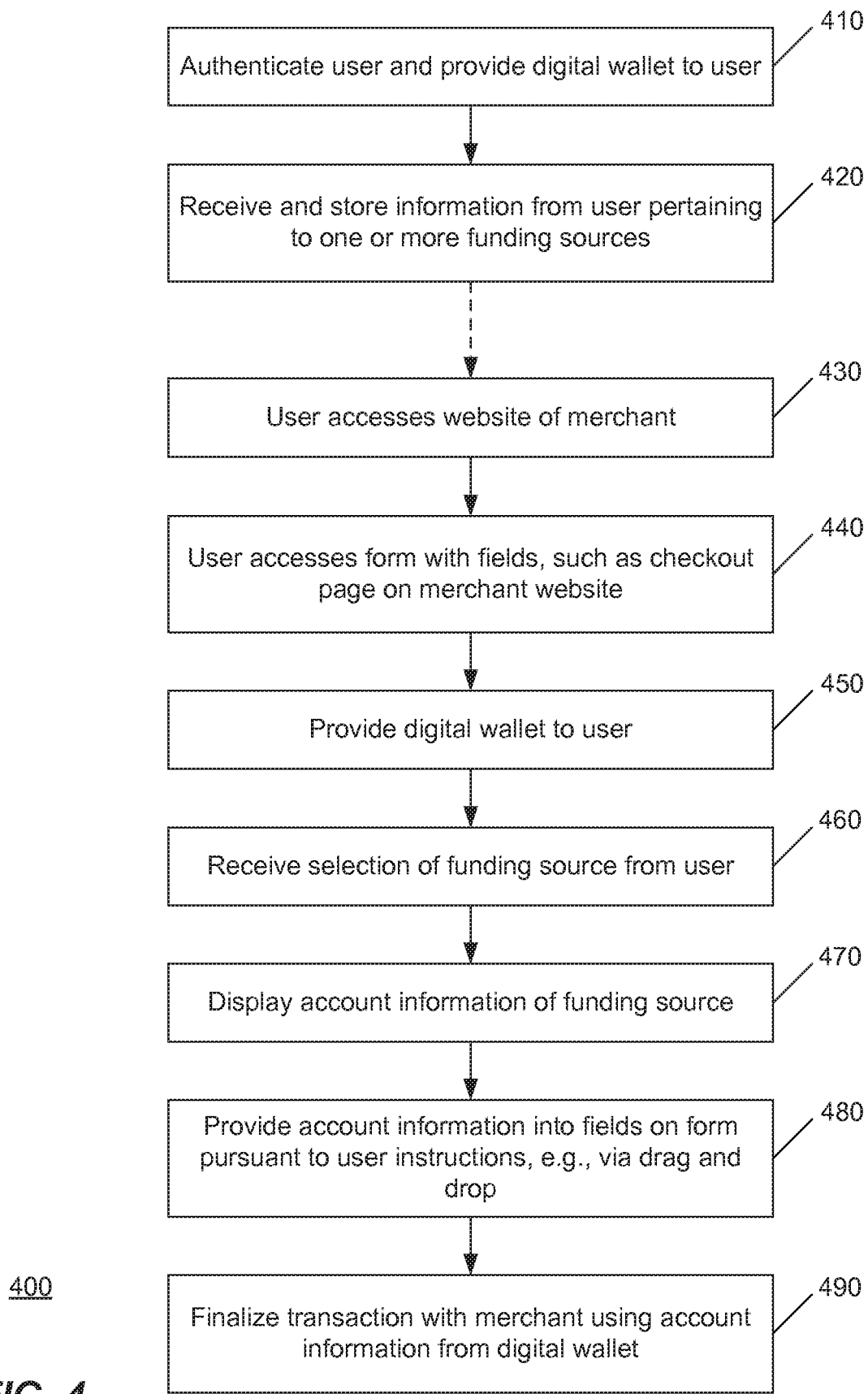
FIG. 4 is an operational flow of an implementation of a method of creating and using a digital wallet.

FIG. 4 is an operational flow of an implementation of a method 400 of creating and using a digital wallet. At 410, a user may be authenticated and provided with access to the digital wallet. In an implementation, after the plugin software is installed (e.g., as a download from a server, from disk, etc.), the user may access a plugin on a browser on the user computing device and be prompted for login or other authentication information. The user may provide login information to authenticate to the plugin and be provided with access to the digital wallet. In an implementation, biometric hardware may be used to authenticate the user. Hardware devices such as tokens may also be used in an implementation.

At 420, account information pertaining to one or more funding sources may be received from the user and stored in the digital wallet. The user may provide account information for the funding sources via the plugin, using dialog boxes, dropdown menus, and selection buttons and icons pertaining to digital wallet functionality, for example. The user may set up and maintain (e.g., add, modify, delete) account information in the digital wallet in this manner.

In an implementation, the user may provide the account information by typing the account information into a template. The template may contain generic fields or may be tailored to a particular merchant. The user may provide account information by other input means, such as by clicking or otherwise selecting characters on a display or providing an encrypted file of account information to the plug. The encrypted file of account information may be generated and provided to the user by a funding source associated with the account information. Such an encrypted file may protect the user from malicious key logging programs designed to steal sensitive information.

At some point, at 430, the user may access a website of a merchant via a user computing device with a browser. The user may log in to the website or may access the website without logging in, depending on the implementation. Web pages may be provided to the browser of the user computing device.

At 440, the user may access a form with fields on a web page of the merchant website. In an implementation, the user may access a checkout page on the merchant website. The digital wallet may be provided to the user at 450 upon a request of the user or automatically if the plugin is monitoring the user activity with respect to the website and recognizes a checkout page or a form with fields, for example. In an implementation, the user may authenticate in order to open the digital wallet and access the account information pertaining to funding sources that may be used to populate or fill out the checkout page. In an implementation, the user may provide levels of authentication where each level of authentication provides access to certain information in the digital wallet. For example, the user may provide a password to open the digital wallet and expose less sensitive information (e.g., donor information, voting information, etc.), whereas a second level of authentication may be used to access credit card information in the digital wallet. Another level of authentication may be used to access a money market or loan account information, for example.

The user may consider the funding sources in the digital wallet and select a funding source. At 460, the selection of the funding source may be received from the user. At 470, the account information pertaining to the selected funding source may be displayed in a plugin window on the browser.

The account information for the selected funding source may be provided into the appropriate fields on the form or the checkout page, at 480. In an implementation, the user may drag and drop account information from the plugin window to the fields on the form or the checkout page. At 490, the transaction with the merchant may be finalized using the account information provided from the digital wallet.

Figure 5:
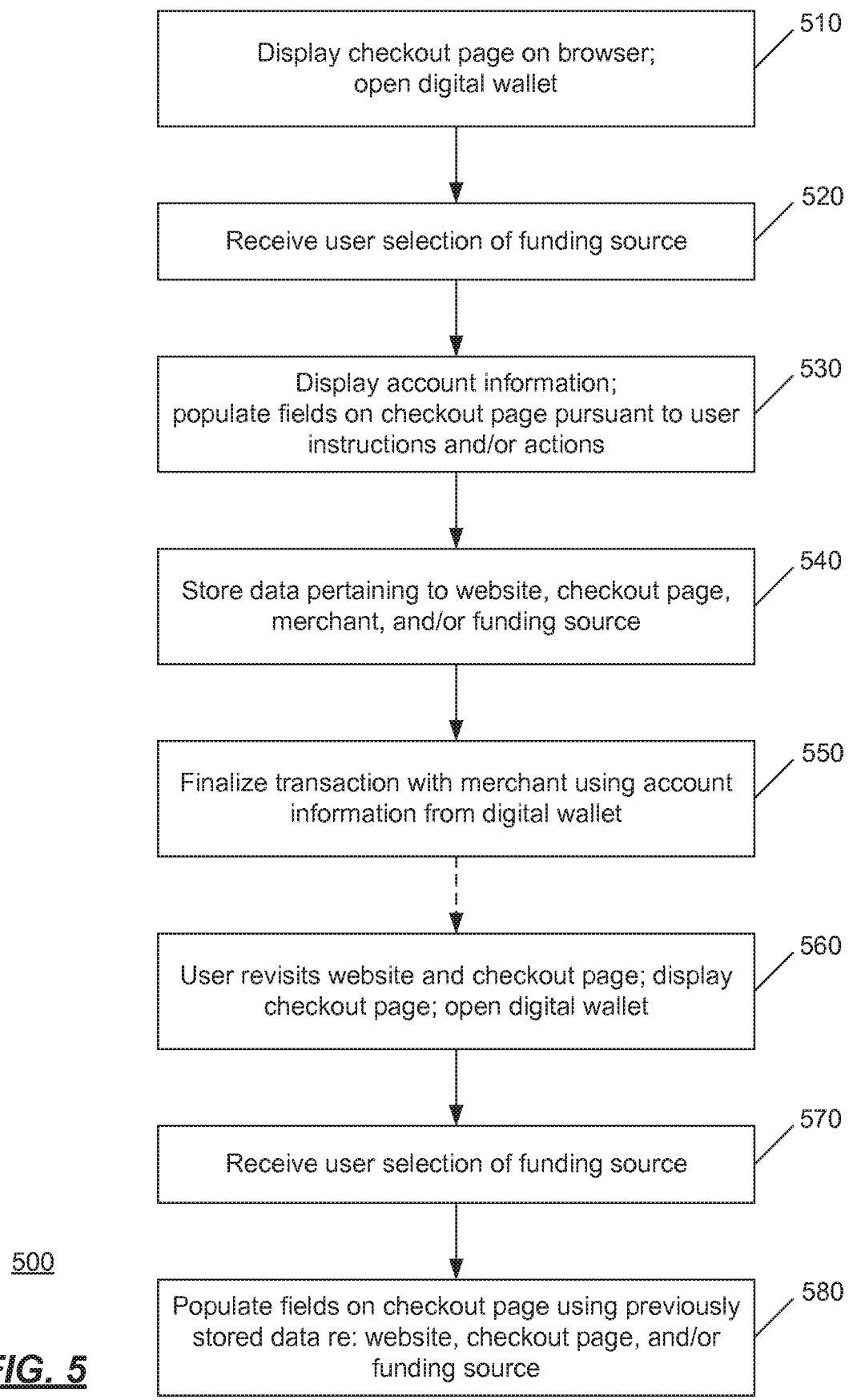
FIG. 5 is an operational flow of an implementation of a method of using a digital wallet.

FIG. 5 is an operational flow of an implementation of a method 500 of using a digital wallet. At 510, a user may visit the website of a merchant and at some point, a checkout page may be displayed on the browser of the user computing device. In an implementation, a digital wallet of the user may be opened and provided to the user via a plugin (e.g., upon authentication of the user).

At 520, the user may select a funding source in the digital wallet and the user selection of the funding source may be received by the plugin. At 530, the account information pertaining to the selected funding source may be displayed, and the fields on the checkout page may be appropriately populated pursuant to user instructions and/or actions.

Data pertaining to the website, the checkout page, the merchant, and/or the funding source may be stored at 540, e.g., in a data store (e.g., storage) associated with the user computing device and/or a data store associated with the plugin or digital wallet. The structure and setup of the checkout page on a website may be stored and may later be recognized, used, and/or populated by the plugin and/or digital wallet. The plugin may be taught or otherwise provided with the correspondence between account information for a funding source and the fields in the checkout page, and may automatically populate the fields the next time(s) the user accesses the checkout page. In an implementation, a template may be customized to each website or checkout web page and stored for future use. At 550, the transaction with the merchant may be finalized using the account information provided from the digital wallet.

At some point, at 560, the user may return to the merchant website and go to the checkout page on the website. The checkout page may be displayed and the digital wallet may be opened and provided to the user. At 570, the user may select a funding source. At 580, based on the previously stored information about the website the checkout page, the merchant and/or the funding source, the fields on the checkout page may be automatically populated using the appropriate funding source data. In an implementation, once the user selects the funding source and it is recognized by the plugin as having previously been used on the checkout page, the plugin may populate the fields on the checkout page without user intervention based on the data previously stored (at 540).

Figure 6:
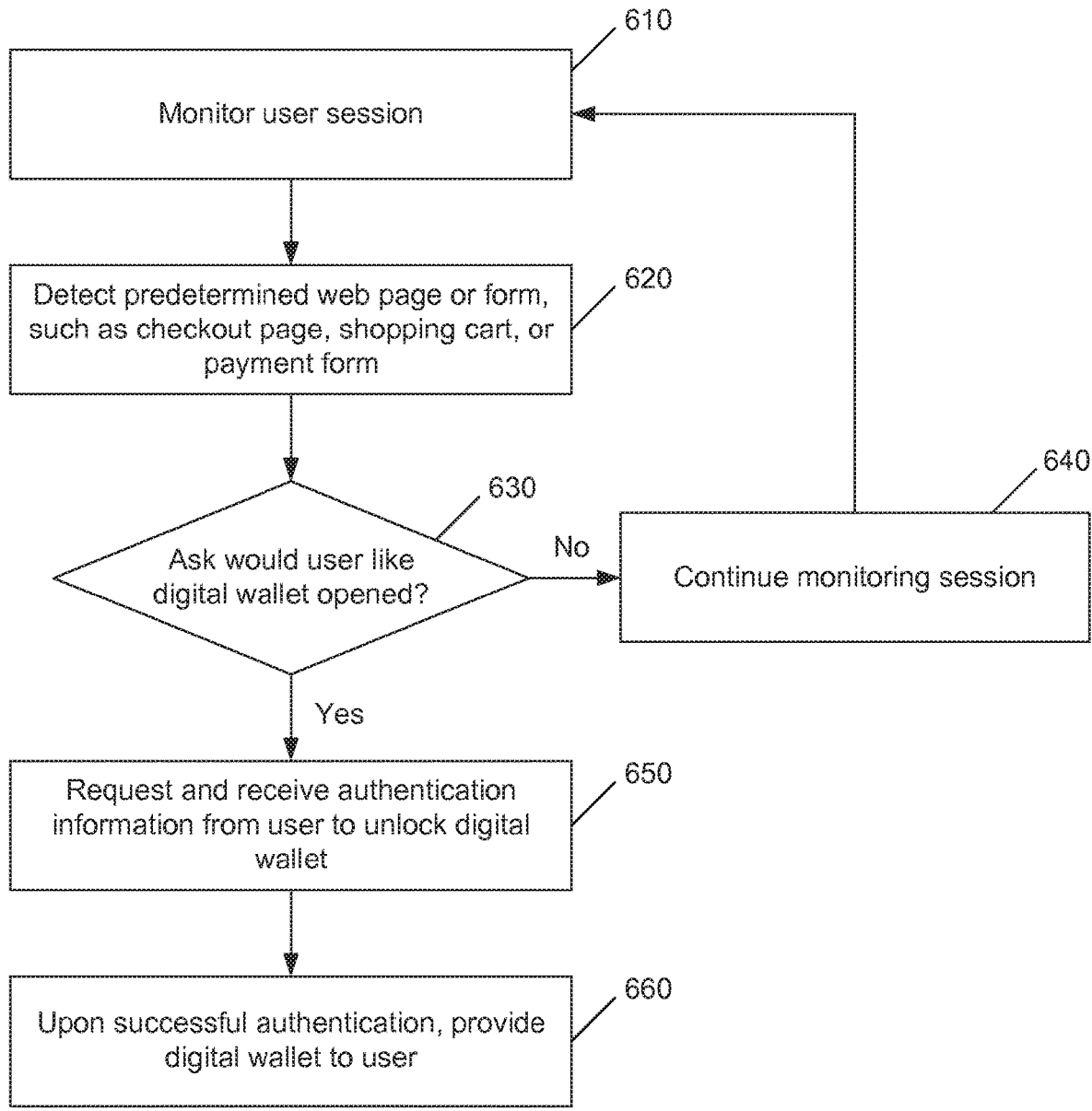
FIG. 6 is an operational flow of another implementation of a method of using a digital wallet.

FIG. 6 is an operational flow of another implementation of a method 600 of using a digital wallet. At 610, a user may access a website and the plugin may monitor the user session on the website. The monitoring may be performed to detect when the user accesses a predetermined type of web page or form, such as a checkout page, a shopping cart, or a payment form (e.g., a form having fields that may be used to receive payment information), for example. At 620, the plugin may detect that the user has accessed a predetermined web page or form, such as a checkout page or form or shopping cart or other content that may use a digital wallet, and processing may continue at 630.

In an implementation, the plugin may use an application and/or calculator to determine a confidence level that the content may use a digital wallet. If the confidence level is above a predetermined threshold (e.g., 90 percent, 95 percent, 98 percent, etc.), it may be determined that the user has accessed content that may use a digital wallet and processing may continue at 630. If the confidence level does not reach the predetermined threshold, then the plugin may continue to monitor the user session, as at 610. In an implementation, the plugin may communicate with the plugin provider to provide anonymous data so that future updates to the plugin may include the web page for others to use. For example, a user may visit a web page that the plugin does not detect as being a checkout page, but once the user designates it as such, data may be sent to the plugin provider so that other users of the plugin may automatically detect the web page as being a checkout page when they visit.

At 630, upon detection of the predetermined web page, checkout page, shopping cart, or payment form, a prompt may be provided to the user asking the user if they would like to access the digital wallet, i.e., open the digital wallet. The plugin may request an instruction from the user as to whether to provide access to the digital wallet. The user may provide a response, e.g., as an answer to the prompt. The answer may take the form of an instruction such as provide access or not provide access (e.g., keep the digital wallet closed).

If the response from the user is to keep the digital wallet closed, then at 640, the prompt may be removed, the user may continue on the web page, and the plugin may continue to monitor the user session with processing continuing at 610.

If the user would like access to the digital wallet as determined at 630, authentication information (e.g., username, password, etc.) may be requested and received from the user at 650. Any authentication technique(s) may be used. Valid or successful authentication may unlock the digital wallet. At 660, with the user having authenticated, the digital wallet may be provided to the user. Depending on the implementation, processing may continue, for example, with the user selecting a funding source, the plugin selecting a funding source, or the plugin recommending a funding source to the user.

In an implementation, the user's response to the query at 630 may be recorded and stored in a file (e.g., in storage) associated with the user and/or the content associated with the user's response. In the future (e.g., during a future session, later in the current session, etc.), when the user accesses the same or similar content, the user's response that had been stored may be retrieved and considered and used in a determination as to whether or not to provide a prompt to the user to ask if they would like to access the digital wallet with respect to that content. For example, if the user did not want to open the digital wallet in the past with respect to particular content, then the user may not be asked in the future about whether they would like to access the digital wallet for that content or similar content.

Figure 7:
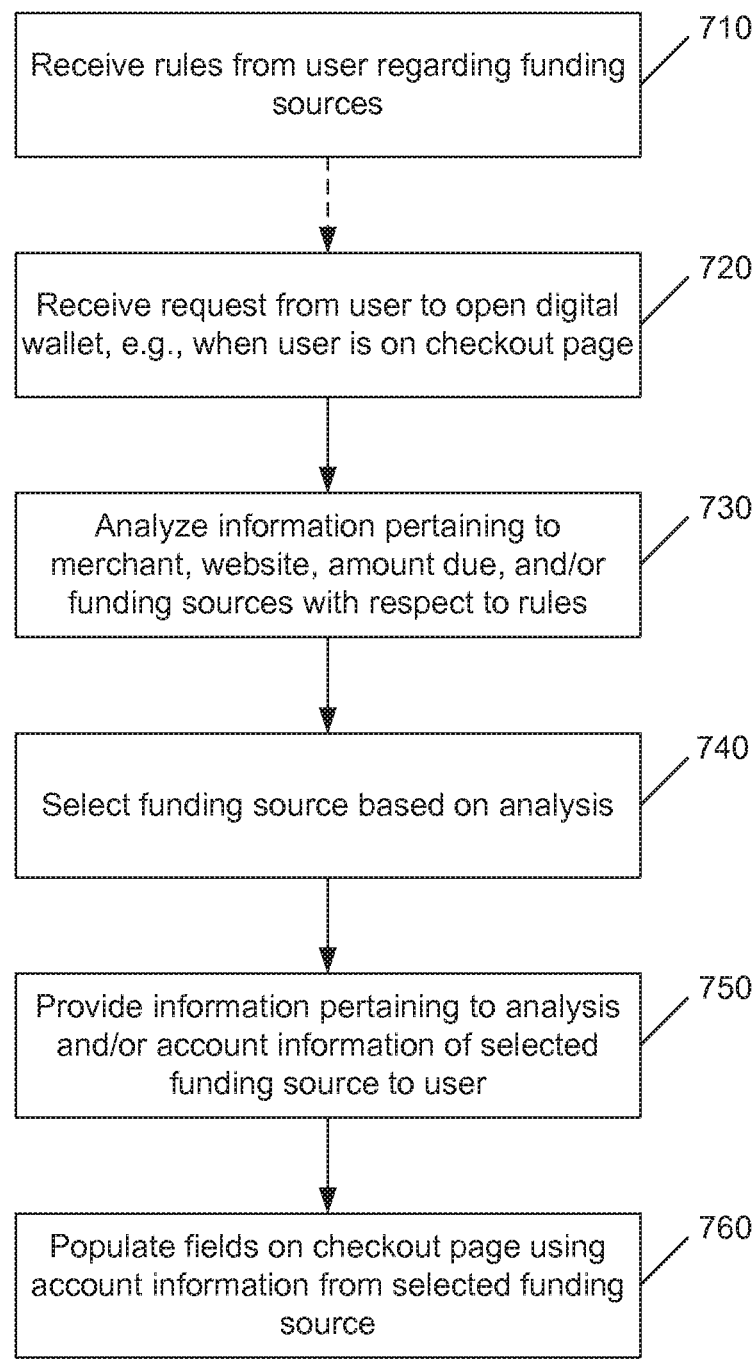
FIG. 7 is an operational flow of another implementation of a method of using a digital wallet.

FIG. 7 is an operational flow of another implementation of a method 700 of using a digital wallet. At 710, the user may provide rules regarding the funding sources via a plugin and the plugin may receive and store the rules. The rules may be directed to which funding sources may be used for particular purchase amounts, may be used at particular merchants, may be used to purchase particular items, etc. The rules may be selected or otherwise provided by the user using known input techniques, such as pulldown menus, selectable buttons and icons, dialogue boxes, fillable forms and fields, responses to prompts and questions, etc.

In an implementation, the user may set a threshold for funding sources. For example, the user may provide a rule that if the amount of the checkout or purchase is below a threshold corresponding to a predetermined amount (e.g., $25, $50, $100, etc.), then a first funding source (e.g., a checking account, a debit card, etc.) from the digital wallet is to be used to make the payment, and otherwise a second funding source (e.g., a credit card, a HELOC, etc.) from the digital wallet is to be used for the payment.

In another implementation, the plugin may run in the background and monitor a user session on the website of a merchant. As items are added to a shopping cart, and the amount of the potential purchase changes (e.g., exceeds a predetermined threshold), the plugin may determine and dynamically select a funding source for the purchase (as established in rules by the user). For example, the user may provide a rule that as the amount of the purchase exceeds a first limit (e.g., $50, $100, etc.), the plugin may select a first funding source (e.g., a debit card, a checking account) as the funding source, as the amount of the purchase exceeds a second limit (e.g., $200, $500, etc.), the plugin may select a second funding source (e.g., a first credit card, a second credit card) as the funding source, and as the amount of the purchase exceeds a third limit (e.g., $1000, $2000, etc.), the plugin may select a third funding source (e.g., a HELOC, a third credit card) as the funding source.

In an implementation, the user may select to associate particular merchants and/or categories (e.g., based on MCCs (merchant category codes)) with particular funding sources. For example, if the category is relevant to office supplies or gasoline, the funding source that may be used is a business credit card, and otherwise a personal credit card is to be used as the funding source. As another example, if the merchant is a particular airline, use a particular airline branded credit card as the funding source, and otherwise use another funding source.

At some point such as when the user is at a checkout page on a merchant website, at 720, the user may request to open a digital wallet via the plugin, for example. The user may authenticate in order to be provided with access to the digital wallet and the account information comprised therein.

At 730, information with respect to the rules may be analyzed. Information relating to the merchant, category of purchase, MCC, website, amount due, and/or funding sources may be considered in view of the rules provided by the user at 710.

At 740, a preferred funding source from the digital wallet may be selected based on the analysis of the rules. The preferred funding source may be the funding source that scores highest in an analysis of the rules or meets the most rules, for example. If more than one funding source is available and meets the rules, the user may be so advised and may be prompted to select a funding source to use for payment. In an implementation, the amount available in the various funding sources of the digital wallet may be checked to determine if each of the funding sources has adequate funding to pay the amount due. If a funding source has inadequate funds to pay the amount due, an indication may be provided in the digital wallet or other notification may be provided to the user that payment may not or should not be made with that funding source.

At 750, information pertaining to the analysis at 740 may be provided to the user. Additionally or alternatively, account information pertaining to the funding source selected by the plugin (or by the user) may be presented to the user.

At 760, the account information of the selected funding source may be used to populate the fields on the checkout page or form. Depending on the implementation, the user may manually populate the fields (e.g., by dragging and dropping account information from a plugin window to the fields on the checkout page or form) or the plugin may automatically populate the fields using techniques described herein for example (e.g., pursuant to user authorization).

Figure 8:
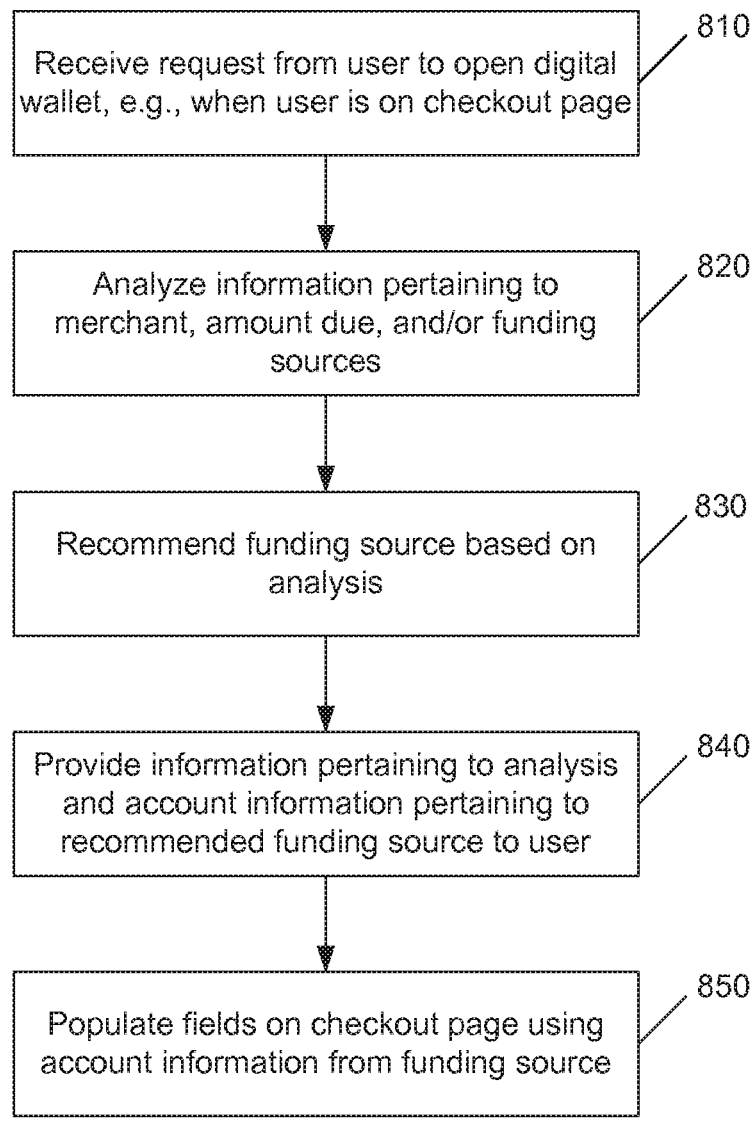
FIG. 8 is an operational flow of another implementation of a method of using a digital wallet.

FIG. 8 is an operational flow of another implementation of a method 800 of using a digital wallet. At 810, similar to 720, a user may request to open a digital wallet, e.g., when the user is on a checkout page of a merchant website and may be provided with access to the digital wallet and its account information.

At 820, the plugin may retrieve and analyze information such as information pertaining to the merchant, the amount due, and/or the funding sources in the digital wallet. The information may be retrieved from the checkout page, the digital wallet, storage associated with the user, storage associated with the merchant, and/or publicly available information (e.g., interest rates, loyalty and reward programs and benefits, etc.). The information may be directed to interest rates of the funding sources, benefits of making a purchase with a particular funding source, limits and available funds of the various funding sources, etc.

At 830, a funding source from the wallet may be recommended based on the analysis of the information. In an implementation, it may be determined whether the merchant gives a preference to a particular funding source (e.g., enhanced reward points, discount, or other bonus if a particular funding source is used) or whether a funding source provides a benefit (e.g., loyalty or reward points, discount, etc.) if used at the merchant. The funding source that provides a benefit may be considered to be a recommended funding source for the merchant.

In an implementation, interest rates of various credit cards of the digital wallet may be retrieved and analyzed. The credit card having the lowest interest rate may be a recommended funding source for the merchant.

At 840, information pertaining to the analysis and account information pertaining to the recommended funding source may be presented to the user. Additional information about the other funding sources may also be provided, such as benefits provided by non-recommended funding sources, interest rates on the funding sources, etc.

At 850, upon authorization by the user, the account information of the recommended funding source may be used to populate the fields on a webpage, manually by the user or automatically by the plugin. In an implementation, the user may choose a different funding source than that recommended by the plugin. In such a case, the account information of the selected funding source may be used to populate the fields on a webpage, manually by the user or automatically by the plugin.

Although the examples described herein may refer to funding sources and using a digital wallet to store funding source information, it is contemplated that any type of account may be accessed and any type of information may be stored in a digital wallet using the techniques and plugins described herein.

Figure 9:
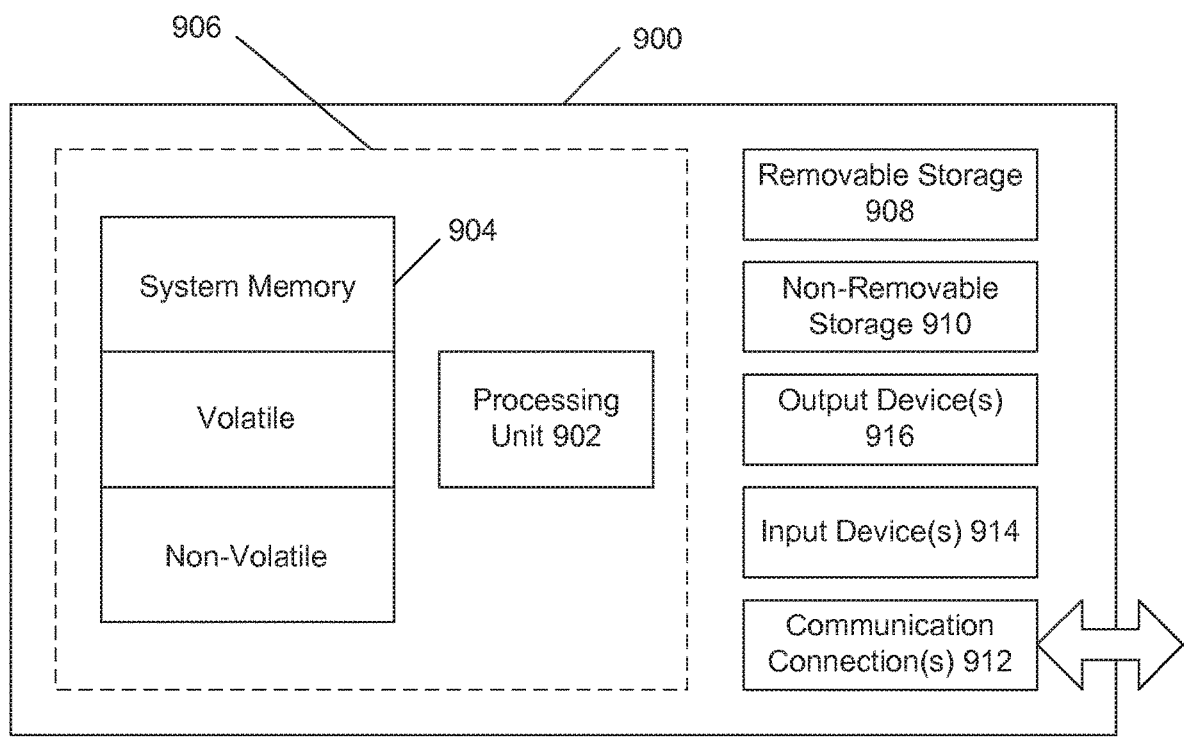
FIG. 9 shows an exemplary computing environment in which example embodiments and aspects may be implemented.

FIG. 9 shows an exemplary computing environment in which example embodiments and aspects may be implemented. The computing environment is only one example of a suitable computing environment and is not intended to suggest any limitation as to the scope of use or functionality.

Numerous other general purpose or special purpose computing environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and system memory 904. Depending on the exact configuration and type of computing device, system memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features and/or functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer-readable media. Computer-readable media can be any available media that can be accessed by computing device 900 and includes both volatile and non-volatile media, and removable and non-removable media. By way of example, and not limitation, computer-readable media may comprise computer storage media and communication media.

Computer storage media include volatile and non-volatile media and removable and non-removable media implemented in any method or technology for storage of information such as computer-readable instructions, data structures, program modules or other data. System memory 904, removable storage 908, and non-removable storage 910 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may also contain communication connection(s) 912 that allow the computing device 900 to communicate with other devices. Communication connection(s) 912 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

Computing device 900 may be one of a plurality of computing devices 900 inter-connected by a network. As may be appreciated, the network may be any appropriate network, each computing device 900 may be connected thereto by way of communication connection(s) 912 in any appropriate manner, and each computing device 900 may communicate with one or more of the other computing devices 900 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium comprising computer-readable instructions that when executed by a processor, direct the processor to:
   store account information for a plurality of funding sources in a digital wallet, the digital wallet stored on a first computing device associated with a user and a second computing device associated with the user, wherein the digital wallet has various levels of authentication based on access to information, wherein the account information includes the plurality of funding sources, reward programs, loyalty programs, membership information, account numbers, personal identification numbers, passwords, and data related to credentials and authentication, wherein the account information is stored only locally on at least one of the first computing device or the second computing device, wherein the digital wallet and the account information are stored locally in an encrypted form;
   analyze information, pertaining to a content of a web page of a website accessed by the user, with the first computing device to determine if the web page displays a checkout page, shopping cart, payment form, or a form with fields;
   determine a non-binary confidence level specifying whether content on the web page of the website will use the digital wallet;
   in response to the non-binary confidence level being at or above a threshold:
      present a dialogue on the first computing device to request first authentication information to allow the user to access a first level of authentication that unlocks the digital wallet stored on the first computing device,
      in response to authenticating the user to the first level of authentication, request second authentication information to allow the user to access a second level of authentication that allows payment card information to be accessed, wherein the first and second authentication information are different with respect to each other,
      in response to authenticating the user to the level allowing the payment card information to be accessed:
         present a dockable window with a tabbed user interface on the first computing device that includes the plurality of funding sources with information from the digital wallet stored on the first computing device,
         monitor the shopping cart and an amount of a total purchase,
         in response to the amount of the total purchase changing, compare the amount of the total purchase to first and second limits, wherein the first and second limits are non-zero and different from each other,
            in response to the amount of the total purchase being less than the first limit, select a first funding source from the plurality of funding sources,
            in response to the amount of the total purchase exceeding the first limit, select a second funding source from the plurality of funding sources,
            in response to the amount of the total purchase exceeding the second limit, select a third funding source from the plurality of funding sources, and
         populate a plurality of fields on the web page with the selected one or more of the plurality of funding sources, wherein the account information is retrieved from the tabbed user interface,
         transmit account information associated with the selected one or more of the plurality of funding sources to a merchant computing device; and
      synchronize the account information stored locally in the digital wallet on the first computing device associated with the user and on the second computing device associated with the user.

2. The non-transitory computer-readable medium of claim 1, wherein in response to the non-binary confidence level being at or above the threshold, the computer-readable instructions, when executed by the processor, further direct the processor to monitor the website.

3. The non-transitory computer-readable medium of claim 1, wherein the computer-readable instructions, when executed by the processor, further direct the processor to: receive a request to open the digital wallet prior to analyzing the information pertaining to the content of the web page, wherein the analysis is performed responsive to receiving the request to open the digital wallet.

4. The non-transitory computer-readable medium of claim 1, wherein the information pertaining to the content of the web page is analyzed with respect to a plurality of rules received from the user of the digital wallet.

5. The non-transitory computer-readable medium of claim 4, wherein the information pertaining to the content of the web page is further analyzed based on information pertaining to a merchant affiliated with the website.

6. The non-transitory computer-readable medium of claim 1, wherein the computer-readable instructions, when executed by the processor, further direct the processor to: recommend a funding source of one of the plurality of funding sources.

7. The non-transitory computer-readable medium of claim 1, wherein the computer-readable instructions, when executed by the processor, further direct the processor to: detect the web page of the website; and in response to detecting the web page of the website, automatically access the digital wallet.

8. The non-transitory computer-readable medium of claim 1, wherein the non-binary confidence level of the web page is at or above the threshold in response to the web page being the checkout page of the website.

9. A method comprising:
storing account information for a plurality of funding sources in a digital wallet, the digital wallet stored on each of a first computing device associated with a user and a second computing device associated with the user,
wherein the digital wallet has various levels of authentication based on access to information, wherein the account information includes the plurality of funding sources, reward programs, loyalty programs, membership information, account numbers, personal identification numbers, passwords, and data related to credentials and authentication, wherein the account information is stored only locally on at least one of the first computing device or the second computing device, wherein the digital wallet and the account information are stored locally in an encrypted form;
analyzing information, pertaining to a content of a web page of a website accessed by the user and with the first computing device, by determining one or more of: if the web page displays a checkout page, if the web page displays a shopping cart, if the web page displays a payment form, or if the web page displays a form with fields;
determining, by a processor, a non-binary confidence level specifying whether content on the web page of the website will use the digital wallet;
in response to the non-binary confidence level being at or above a threshold:
presenting a dialogue on the first computing device to request first authentication information to allow the user to access a first level of authentication that unlocks the digital wallet stored on the first computing device,
in response to authenticating the user to the first level of authentication, requesting second authentication information to allow the user to access a second level of authentication that allows payment card information to be accessed, wherein the first and second authentication information are different with respect to each other,
in response to authenticating the user to the level allowing the payment card information to be accessed:
presenting a dockable window with a tabbed user interface on the first computing device that includes the plurality of funding sources with information from the digital wallet stored on the first computing device,
monitoring the shopping cart and an amount of a total purchase,
in response to the amount of the total purchase changing, comparing the amount of the total purchase to first and second limits, wherein the first and second limits are non-zero and different from each other,
in response to the amount of the total purchase being less than the first limit, selecting a first funding source from the plurality of funding sources,
in response to the amount of the total purchase exceeding the first limit, selecting a second funding source from the plurality of funding sources,
in response to the amount of the total purchase exceeding the second limit, selecting a third funding source from the plurality of funding sources, and
populating a plurality of fields on the web page with the selected one or more of the plurality of funding sources,
transmitting account information associated with the selected one or more of the plurality of funding sources to a merchant computing device; and
synchronizing the account information stored locally in the digital wallet on the first computing device associated with the user and the digital wallet on the second computing device associated with the user.

10. The method of claim 9, further comprising: in response to the non-binary confidence level being at or above the threshold, monitoring the website.

11. The method of claim 9, further comprising: receiving a request to open the digital wallet prior to analyzing the information pertaining to the content of the web page, wherein the analysis is performed responsive to receiving the request to open the digital wallet.

12. The method of claim 9, wherein the information pertaining to the content of the web page is analyzed with respect to a plurality of rules received from the user of the digital wallet.

13. The method of claim 12, wherein the information pertaining to the content of the web page is further analyzed based on information pertaining to a merchant affiliated with the website.

14. The method of claim 9, further comprising:
detecting the web page of the website; and
in response to detecting the web page of the website, automatically accessing the digital wallet.

15. The method of claim 9, wherein the non-binary confidence level of the web page is at or above the threshold in response to the web page being the checkout page of the website.

16. A digital wallet system, comprising:
one or more processors; and
a computer-readable storage medium having instructions stored thereon, which, when executed by the one or more processors, cause the digital wallet system to:
store account information for a plurality of funding sources in a digital wallet, the digital wallet stored on a first computing device associated with a user and a second computing device associated with the user,
wherein the digital wallet has various levels of authentication based on access to information, wherein the account information includes the plurality of funding sources, reward programs, loyalty programs, membership information, account numbers, personal identification numbers, passwords, and data related to credentials and authentication, wherein the account information is stored only locally on at least one of the first computing device or the second computing device, wherein the digital wallet and the account information are stored locally in an encrypted form;
analyze information pertaining to a content of a web page of a website accessed by the user;

determine a non-binary confidence level specifying whether content on the web page of the website will use the account information in the digital wallet;

in response to the non-binary confidence level being at or above a threshold:

present a dialogue on the first computing device to request first authentication information to allow the user to access a first level of authentication that unlocks the digital wallet stored on the first computing device, in response to authenticating the user to the first level of authentication, request second authentication information to allow the user to access a second level of authentication that allows payment card information to be accessed, wherein the first and second authentication information are different with respect to each other, in response to authenticating the user to the level allowing the payment card information to be accessed:

present a dockable window with a tabbed user interface on the first computing device that includes the plurality of funding sources with information from the digital wallet stored on the first computing device, monitor the web page and an amount of a total purchase, in response to the amount of the total purchase changing, compare the amount of the total purchase to first and second limits, wherein the first and second limits are non-zero and different from each other, in response to the amount of the total purchase being less than the first limit, select a first funding source from the plurality of funding sources, in response to the amount of the total purchase exceeding the first limit, select a second funding source from the plurality of funding sources, in response to the amount of the total purchase exceeding the second limit, select a third funding source from the plurality of funding sources, and populate a plurality of fields on the web page with the selected one or more of the plurality of funding sources, transmit account information associated with the selected one or more of the plurality of funding sources to a merchant computing device, and synchronize the account information stored locally in the digital wallet on the first computing device associated with the user and the digital wallet on the second computing device associated with the user.

17. The digital wallet system of claim 16, wherein the instructions, when executed by the one or more processors, further cause the digital wallet system to:

detect the web page of the website; and in response to detecting the web page of the website, automatically access the digital wallet.

18. The digital wallet system of claim 16, wherein the non-binary confidence level of the web page is at or above the threshold in response to the web page being a checkout page of the website.

\* \* \* \* \*